United States Patent
Miyazoe et al.

(10) Patent No.: US 6,189,858 B1
(45) Date of Patent: Feb. 20, 2001

(54) PIEZOELECTRIC VALVE

(75) Inventors: Shinji Miyazoe; Makoto Ishikawa, both of Ibaraki-ken (JP)

(73) Assignee: SMC Kabushiki Kaisha, Tokyo (JP)

( * ) Notice: Under 35 U.S.C. 154(b), the term of this patent shall be extended for 0 days.

(21) Appl. No.: 09/355,951
(22) PCT Filed: Dec. 11, 1998
(86) PCT No.: PCT/JP98/05623
§ 371 Date: Aug. 12, 1999
§ 102(e) Date: Aug. 12, 1999
(87) PCT Pub. No.: WO99/31420
PCT Pub. Date: Jun. 24, 1999

(30) Foreign Application Priority Data

Dec. 12, 1997 (JP) .................................................... 9-343346
Jan. 21, 1998 (JP) .................................................. 10-009897

(51) Int. Cl.[7] ............................ F16K 31/02; F16K 31/00
(52) U.S. Cl. ..................................... 251/129.06; 251/335.2
(58) Field of Search ............................. 251/129.06, 335.2

(56) References Cited

U.S. PATENT DOCUMENTS

| | | | |
|---|---|---|---|
| 4,254,938 | * 3/1981 | Inada et al. | 251/367 |
| 4,581,624 | * 4/1986 | O'Connon | 251/129.06 |
| 4,903,732 | * 2/1990 | Allen | 251/129.06 |
| 5,029,805 | * 7/1991 | Albarda et al. | 251/129.06 |
| 5,628,411 | * 3/1997 | Mills et al. | 251/129.06 |
| 5,638,862 | * 3/1981 | Miller | 251/335.2 |

FOREIGN PATENT DOCUMENTS

| | | | |
|---|---|---|---|
| 62-224780 | * 6/1987 | (JP) | 251/129.06 |
| 62-28585 | * 6/1987 | (JP) | 251/129.06 |

* cited by examiner

Primary Examiner—Kevin Shaver
Assistant Examiner—David A. Bonderer
(74) Attorney, Agent, or Firm—Oblon, Spivak, McClelland, Maier & Neustadt, P.C.

(57) ABSTRACT

When a drive signal is not applied to a piezoelectric element 42, a diaphragm 38 is contacted with a valve seat 52 to disconnect diaphragm chambers 24a, 24b from a passage 54. In this case, even if the pressure of a fluid introduced into the diaphragm chambers 24a, 24b is varied, the diaphragm 38 is positively supported by a valve seat 52 with no deformation, resulting in the passage 54 being positively closed up. Therefore, the possibility of the fluid leaking is eliminated. On the other hand, when a drive signal is applied to the piezoelectric element 42, the diaphragm 38 is bent, and thus the diaphragm chambers 24a, 24b are connected with the passage 54, resulting in the fluid being allowed to flow into the passage 54. If the piezoelectric element 42 comes to bend excessively, the piezoelectric element 42 is brought into contact with a cushioning member 56 to prevent the piezoelectric element 42 from being excessively deformed. Therefore, there is no possibility of the piezoelectric element 42 being damaged.

15 Claims, 14 Drawing Sheets

PIEZOELECTRIC VALVE

TECHNICAL FIELD

The present invention relates to a piezoelectric valve which displaces a diaphragm under the bending action of a piezoelectric element, controls the inflow and outflow of the fluid, and controls the flow rate.

BACKGROUND ART

Up to now, a piezoelectric valve which is used to control the inflow and outflow of the fluid or the flow rate is disclosed in U.S. Pat. No. 5,628,411, for example. As shown in FIG. 13, this piezoelectric valve 1 is configured so that a diaphragm 3 whereon a piezoelectric element 2 is provided can be brought near or separated from a valve seat 5 of an output port 4. In this case, if the pressure of compressed air is introduced into a pressure chamber 6 from an input port 7 is P, a force Fp applied to the output port 4 is expressed by:

$$Fp = \pi/4 \times D^2 \times P$$

(D: Diameter of opening of output port 4)
On the other hand, a recovering force Fs of the diaphragm 3 when the diaphragm 3 is displaced by an amount of displacement of $x_1$ to close up the output port 4 is expressed by:

$$Fs = k_1 \times x_1$$

($k_1$: Spring constant)
And, with this piezoelectric valve 1, by setting the pressure P of the compressed air so that Fp=Fs, a closed state is maintained.

On the other hand, when the output port 4 is to be opened, drive power is applied to the piezoelectric element 2 to change the amount of bending of the piezoelectric element 2 for separating the diaphragm 3 from the valve seat 5. This results in that the compressed air is allowed to flow from the pressure chamber 6 to the output port 4.

However, with the above prior art, there is a possibility of that, if the pressure P of the compressed air is varied, the force Fp applied to the diaphragm 3 is varied, as shown in FIG. 14, and when the recovering force Fs is larger than the force Fp, the diaphragm 3 is separated from the valve seat 5, resulting in the compressed air being allowed to leak from the output port 4.

The present invention has been provided to solve the above stated problem, being intended to offer a piezoelectric valve with which there is no possibility of the fluid leaking from the pressure chamber with a variation in the pressure of the supplied fluid.

DISCLOSURE OF THE PRESENT INVENTION

To accomplish the above purpose, the piezoelectric valve according to the present invention comprises a diaphragm which is disposed in diaphragm chambers whereto a fluid is supplied from an input port, and constitutes a valve body;

a piezoelectric element which is provided on one surface of the diaphragm, and displaces the diaphragm;

a cushioning member which is opposed to the piezoelectric element, and provided on a housing forming the diaphragm chambers; and a valve seat which is provided for an output port opening in the housing, and wherewith the other surface of the diaphragm can be contacted;

wherein, when no drive power is applied to the piezoelectric element, the diaphragm is contacted with the valve seat with no elastic energy being built up therein for closing up the output port.

According to the present invention, when no drive power is applied to the piezoelectric element, a variation in the pressure of the supplied fluid will not cause the diaphragm to be separated from the valve seat, thus leakage of the fluid from the output port resulting from the pressure variation is prevented. In addition, if the piezoelectric element is excessively deformed, the piezoelectric element is contacted with the cushioning member, which can prevent the piezoelectric element itself being damaged.

In this case, if, between the diaphragm and the housing, a clearance connecting the diaphragm chambers to each other which is partitioned by the diaphragm is formed, and a fluid introduced into the diaphragm chambers can freely flow through the clearance, there is no need for providing another passage to introduce the fluid to both the one side and the other side of the diaphragm, which allows the construction of this piezoelectric valve to be simplified, which is favorable.

In addition, if the portion of the valve seat which contacts with the diaphragm is formed flat and smoothly, while the diaphragm is formed with a metallic sheet, and the portion of the diaphragm which contacts with the valve seat is formed flat and smoothly, the strength of the diaphragm can be improved, and when the diaphragm is contacted with the valve seat, the fluid can be prevented from leaking from the valve seat, which is more favorable.

Further, if grooves are formed in the surface of the cushioning member which is opposed to the piezoelectric element, the piezoelectric element can be prevented from adhering to the cushioning member, which is preferable.

Still further, if, between the piezoelectric element and the housing, an elastic member which energizes the diaphragm toward the valve seat is provided, while, on the piezoelectric element, a seating member whereon the elastic member is seated is provided, the piezoelectric element can be prevented from adhering to the cushioning member by means of the elastic member, and when the diaphragm is contacted with the valve seat, the output port can be positively closed up by means of the elastic member.

In addition, the present invention comprises a plurality of diaphragms which are disposed in diaphragm chambers whereto a fluid is supplied from an input port, for constituting a valve body;

piezoelectric elements which are provided on the diaphragms, respectively, and displace the diaphragms; and valve seats which are provided for a plurality of output ports opening in a housing forming the diaphragm chambers, and wherewith the diaphragms can be contacted, respectively, wherein:

when no drive power is applied to the piezoelectric elements, the diaphragms are contacted with the valve seats with no elastic energy being built up in the diaphragms for closing up the output ports, and by selectively or simultaneously displacing the plurality of diaphragms, the fluid being selectively or simultaneously introduced to the plurality of output ports.

According to the present invention, the flow rates of the compressed air introduced to a plurality of output ports can be controlled by means of a single piezoelectric valve, which eliminates the need for providing a plurality of piezoelectric valves, and thus allows simplifying the construction of a device using this piezoelectric valve.

BEST MODE FOR CARRYING OUT THE INVENTION

For the piezoelectric valve according to the present invention, preferred embodiments thereof will be explained in detail with reference to the accompanying drawings.

Figure 1:
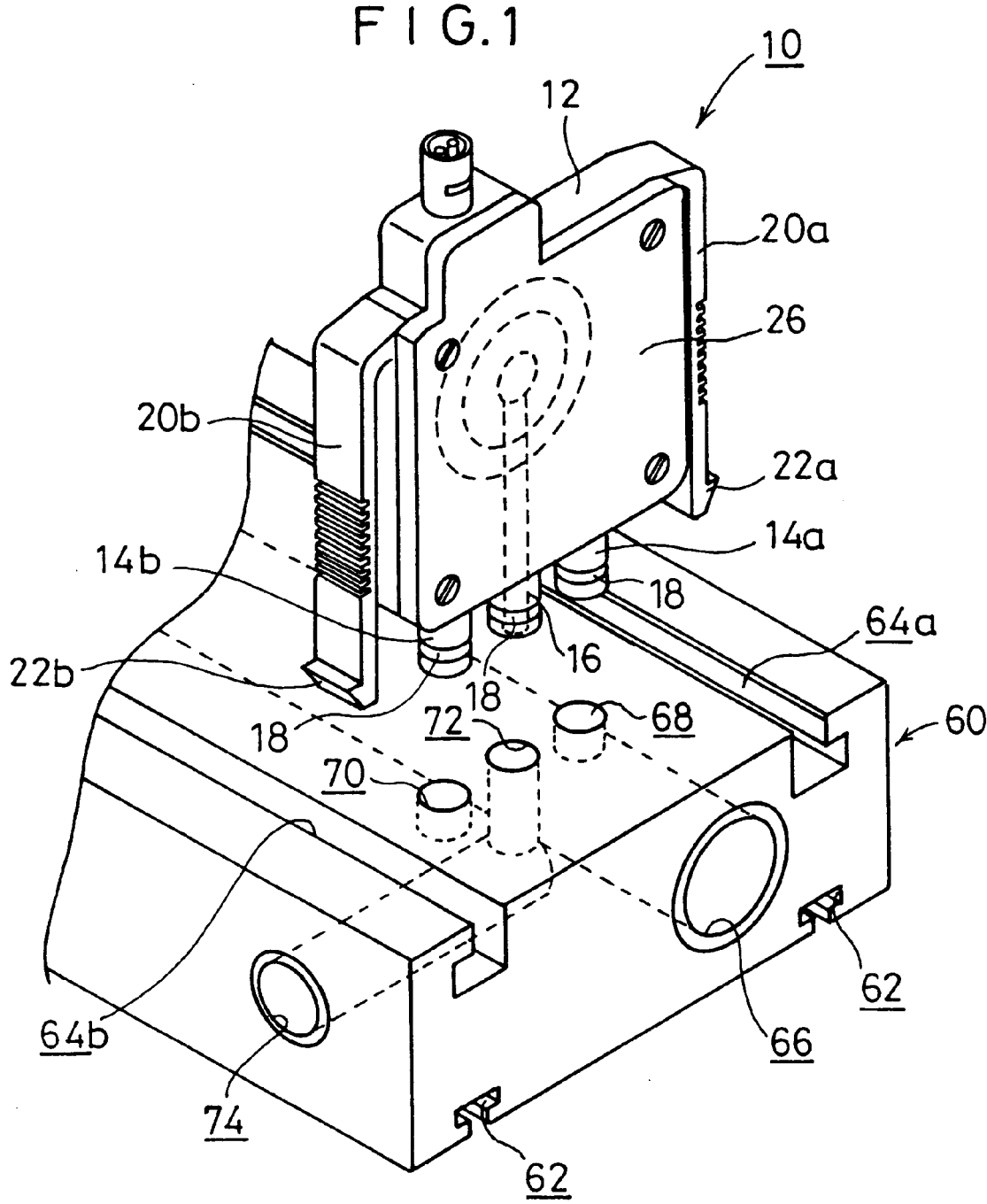
FIG. 1 shows a perspective view of a piezoelectric valve according to the first embodiment of the present invention, and a base plate whereon this piezoelectric valve is mounted.
Figure 2:
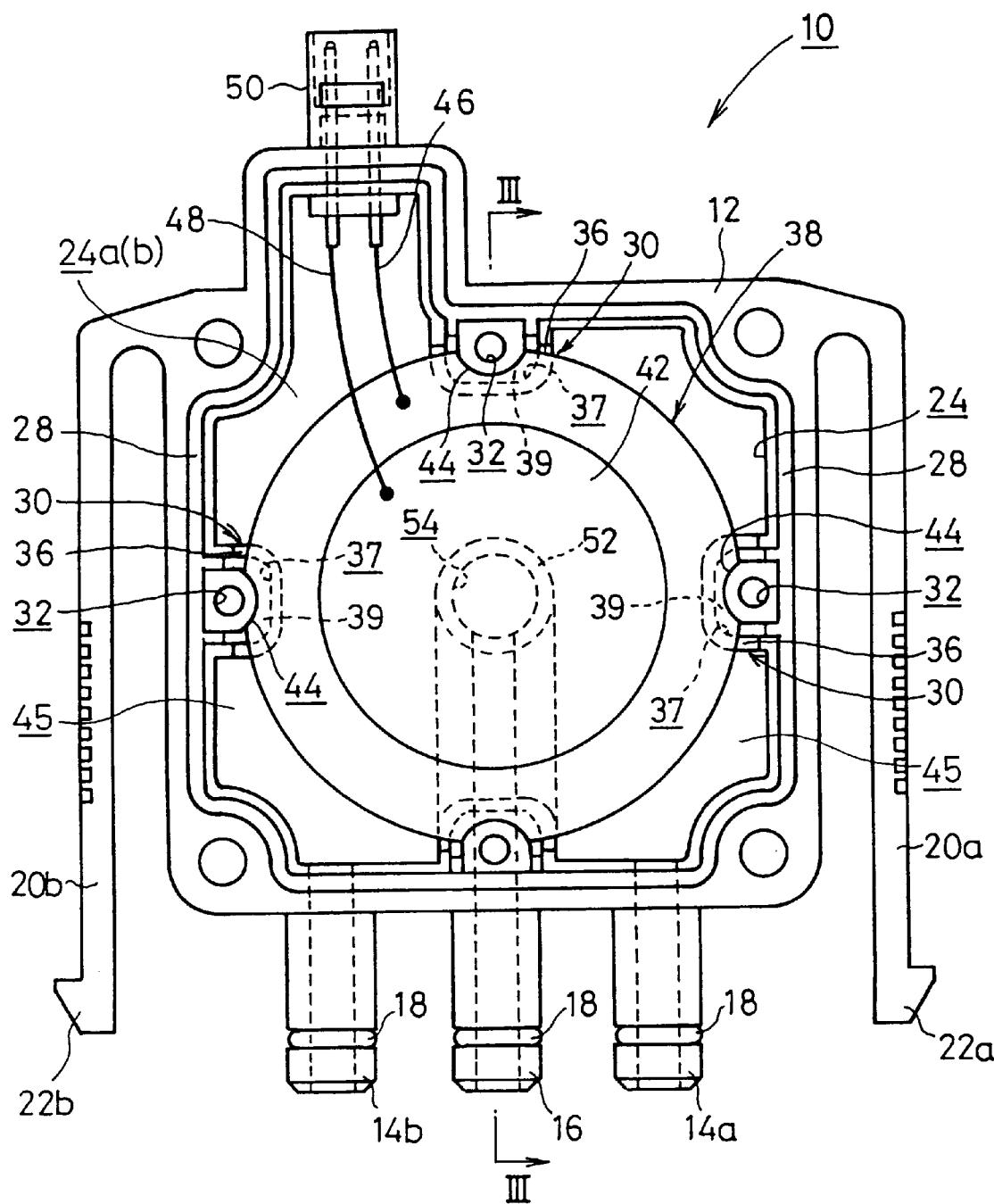
FIG. 2 shows a front view of the piezoelectric valve in FIG. 1 illustrating the state wherein the cover member is removed.
Figure 3:
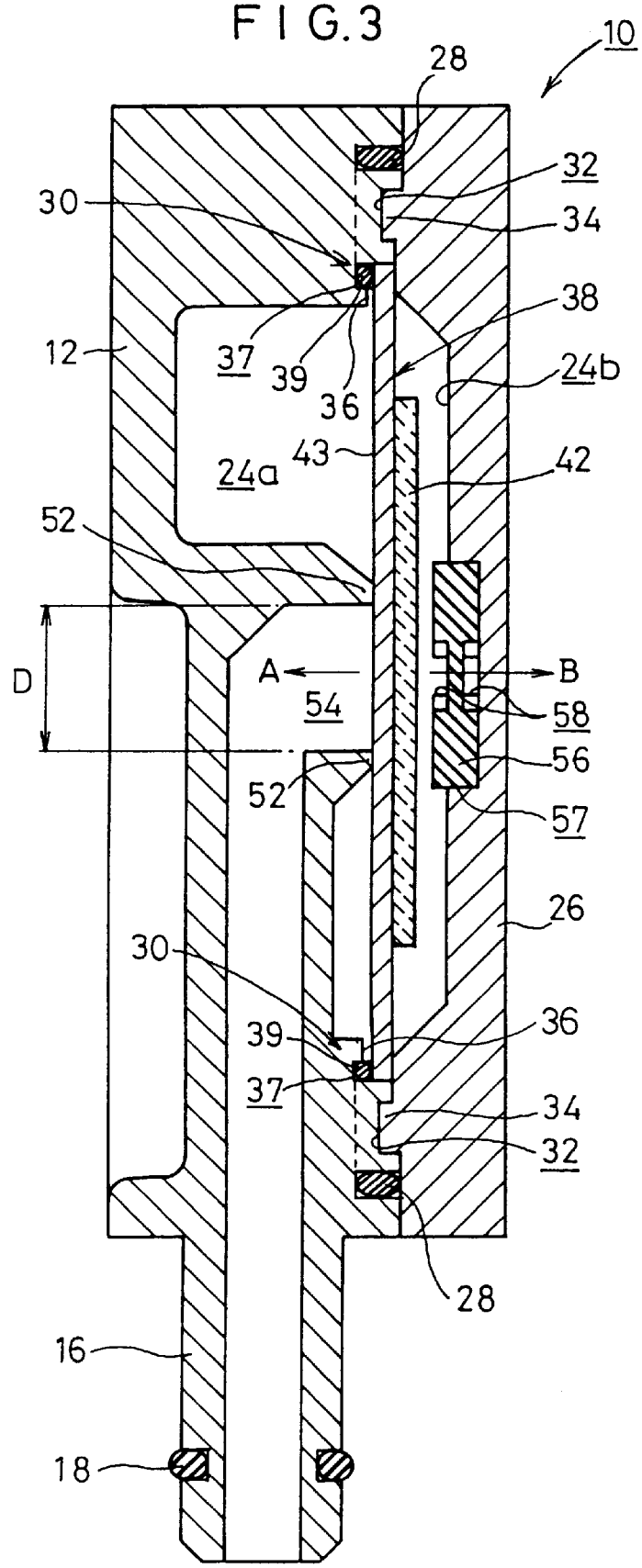
FIG. 3 shows a sectional view of the piezoelectric valve in FIG. 2 taken along line III—III.

In FIG. 1 to FIG. 3, the reference numeral 10 denotes a piezoelectric valve according to the first embodiment of the present invention. The piezoelectric valve 10 comprises a housing 12, and on the outside of the housing 12, input ports 14a, 14b and an output port 16 for compressed air are formed, being protruded. On the peripheries of the input ports 14a, 14b, and the output port 16, an O-ring 18 is provided, respectively. On the housing 12, lever portions 20a, 20b which are used in mounting the piezoelectric valve 10 and can be elastically freely bent are formed, and at the ends of the lever portions 20a, 20b, engaging pawls 22a, 22b are formed.

In the inside of the housing 12, a diaphragm chamber 24a connecting to the input port 14a, 14b is defined, the diaphragm chamber 24a is closed up by a cover member 26, and the housing 12 and the cover member 26 form another diaphragm chamber 24b. In the vicinity of the opening closed up by the cover member 26 for the housing 12, a sealing member 28 is provided, and by this sealing member 28, leakage of the compressed air from the diaphragm chambers 24a, 24b is prevented. On the wall portion constituting the diaphragm chamber 24a, a plurality of support portions 30 are formed, each being spaced 90° apart from adjacent ones, and protruded toward the center of the diaphragm chambers 24a, 24b, and in the support portions 30, a guide hole 32 is defined. Convex portions 34 formed on the cover member 26 are engaged with the guide holes 32 to position the cover member 26. In each support portion 30, a step potion 36 is defined. In the step portions 36, a recess 37 is defined, and a sealing member 39 is engaged with the recess 37.

The sealing member 39 supports the diaphragm 38 constituting a valve body in pressure contact, and the diaphragm 38 is sandwiched between the sealing member 39 and the cover member 26. The sealing member 39 also serves to eliminate the play of the diaphragm 38. The diaphragm 38 is formed in a nearly circular shape with a metal having elasticity such as stainless steel, and, to one of the surfaces of the diaphragm 38, a nearly circular piezoelectric element 42 is fixed, being laminated. The other surface of the diaphragm 38 is formed as a flat smooth surface 43. In the edge portion of the diaphragm 38, a plurality of curved recesses 44 are formed, each being spaced 90° apart from adjacent ones, and the recesses 44 engage with the support portions 30 to position the diaphragm 38 (see FIG. 2). Between the edge portion of the diaphragm 38 and the wall portion constituting the diaphragm chamber 24a, 24b, a clearance 45 is formed, and this clearance 45 connects between the diaphragm chambers 24a and 24b. To the diaphragm 38 whereto one surface of the piezoelectric element 42 is fixed and is formed with a metal, an electric wire 46 is connected, and, to the other surface of the piezoelectric element 42, an electric wire 48 is connected, the respective electric wires 46 and 48 being connected to a controlling device (not shown) through a connector 50. Therefore, the drive signal inputted from the controlling device is applied to one surface and the other surface of the piezoelectric element 42.

In the central portion of the diaphragm chamber 24a, an annular valve seat 52 is formed, being protruded so that it can contact with the diaphragm 38, and, with the valve seat 52, a passage 54 connecting to the output port 16 is formed. With the valve seat 52, the portion which contacts with the diaphragm 38 is formed flat and smoothly, and thus, when the flat smooth surface 43 of the diaphragm 38 is contacted with the valve seat 52, the diaphragm 38 is brought into a tight contact with the valve seat 52 with no clearance, thus leakage of the fluid from the diaphragm chamber 24a to the passage 54 is prevented.

Figure 4:
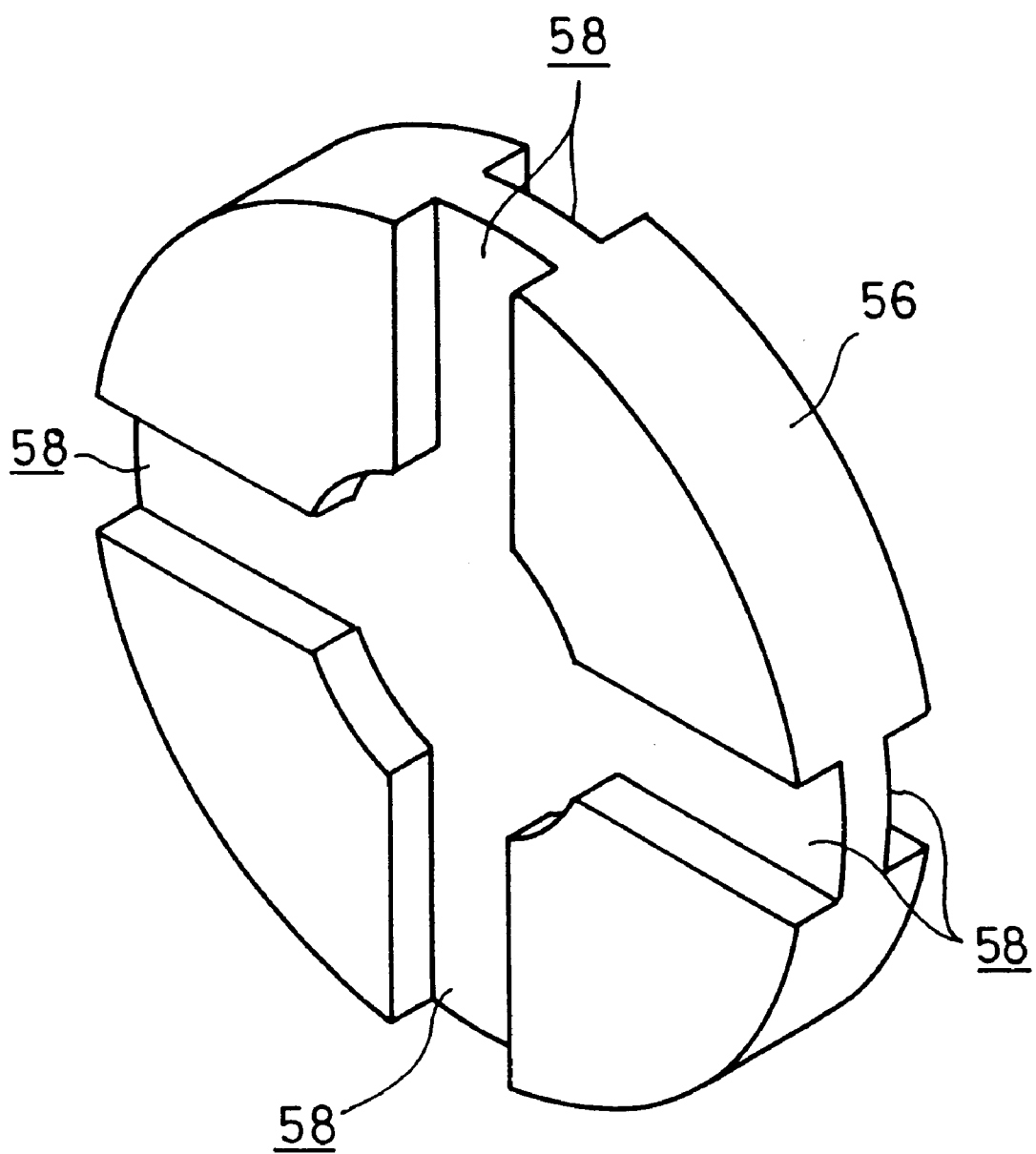
FIG. 4 shows a perspective view of a cushioning member used with the piezoelectric valve in FIG. 1.
Figure 5:
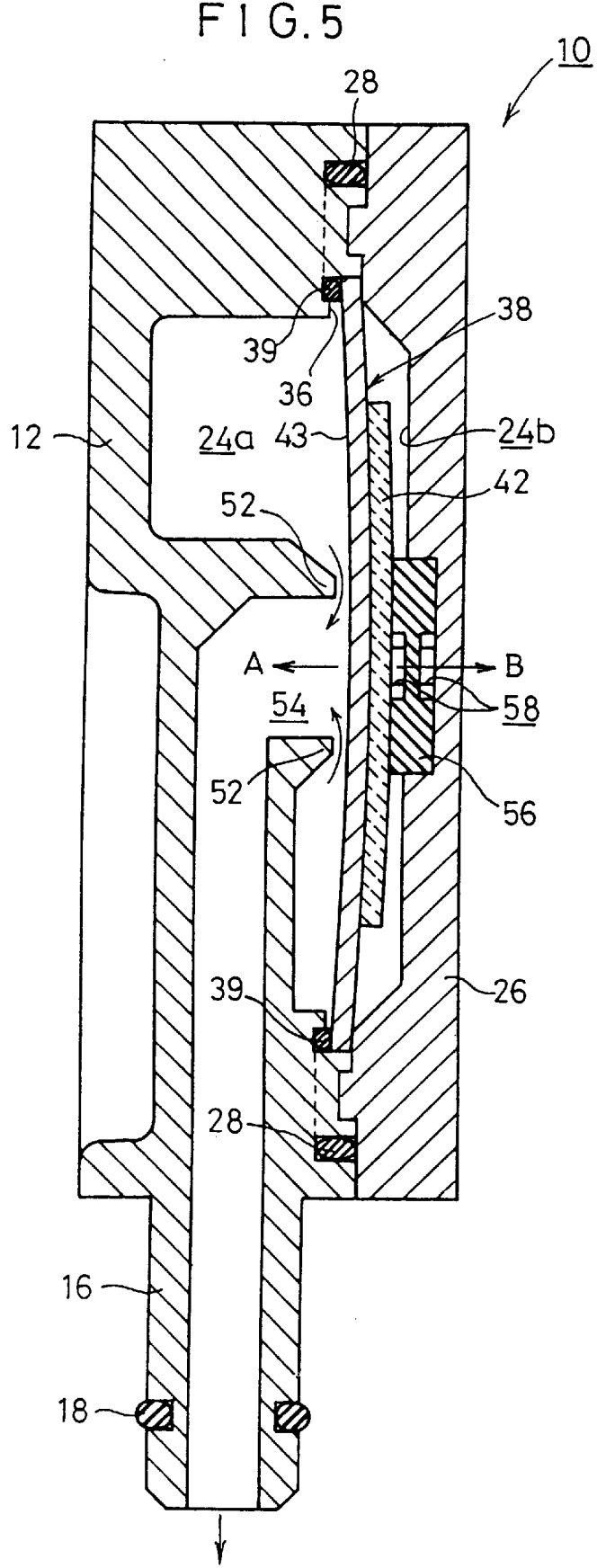
FIG. 5 shows a longitudinal sectional view of the piezoelectric valve in FIG. 3 illustrating the state wherein the passage is opened.

On the other hand, with the cover member 26, a cushioning member 56 formed with a material having an elasticity such as resin and rubber is fixed on the diaphragm chamber 24b side. In other words, on the surface of the cover member 26 which is opposed to the valve seat 52, a circular recess 57 is formed, and into this recess 57, the cushioning member 56 is fitted. The cushioning member 56 is formed in a nearly disk-like shape, as shown in FIG. 4, and a plurality of groove portions 58 are radially defined in both surfaces thereof.

The piezoelectric valve 10 is mounted on an elongate base plate 60 (see FIG. 1). In the bottom surface of the base plate 60, mounting groove portions 62 having a nearly T-shaped cross section to mount this base plate 60 to other member are formed. In addition, in the top surface of the base plate 60, groove portions 64a, 64b having a nearly L-shaped cross section are formed, and, with the wall portions of the groove portions 64a, 64b, the engaging pawls 22a, 22b of the lever portions 20a, 20b can be freely engaged. In other words, by inserting the engaging pawls 22a, 22b into the groove portions 64a, 64b with the lever portions 20a, 20b being bent so that they approach to each other, and then releasing the lever portions 20a, 20b, the engaging pawls 22a, 22b are engaged with the groove portions 64a, 64b, which preventing the piezoelectric valve 10 from releasing therefrom. In the base plate 60, along the longitudinal direction thereof, a supply passage 66 for pressurized fluid is formed, and the supply passage 66 is connected to a compressed air supply (not shown). To the supply passage 66, a supply hole 68 which is opened at the top of the base plate 60 is connected, and to the supply hole 68, one input port 14a for the piezoelectric valve 10 is removably mounted. In addition, in the top surface of the base plate 60, a hole portion 70 whereto the other input port 14b is mounted, and an output hole 72 whereto the output port 16 is mounted are formed. The output hole 72 is connected to an output port 74 which is opened at the side of the base plate 60.

The piezoelectric valve 10 according to the first embodiment of the present invention is basically configured as above, and the function will be described hereinafter.

When no drive signal is applied to the piezoelectric element 42 from the controlling device (not shown) through the connector 50, the piezoelectric element 42 is not deformed, and as long as the pressure in the diaphragm chamber 24a, 24b is the same as or higher than that in the passage 54, elastic energy will not be built up in the diaphragm 38, and the diaphragm 38 will be held in the flat state. In this case, the diaphragm 38 is contacted with the valve seat 52 to close up the passage 54.

When the compressed air supply (not shown) is energized, and compressed air is supplied to the supply passage 66 in the base plate 60, the compressed air is introduced into the diaphragm chambers 24a, 24b through the input port 14a. This is because the diaphragm chambers 24a and 24b are connected to each other through the clearance 45 between the edge portion of the diaphragm 38 and the wall portion for the diaphragm chamber 24a, 24b. In this case, the pressure in the diaphragm chamber 24a, 24b is increased to above that in the passage 54 by the compressed air, thus, the pressure of the compressed air is applied to the diaphragm 38 in the direction of the arrow A (see FIG. 3).

If the diameter of the passage 54 is D, the magnitude of the force Fp which is applied to the diaphragm 38 in the direction of the arrow A by the pressure P of the compressed air is expressed by:

$$Fp = \pi/4 \times D^2 \times P$$

On the other hand, the diaphragm 38 has an elasticity, however, the diaphragm 38 is supported by the valve seat 52, therefore, it is not deformed by the pressure of the compressed air, and thus it is held in the flat state with no elastic energy being built up therein. Therefore, the recovering force Fs applied to the diaphragm 38 in the direction of the arrow B is expressed by:

$$Fs = 0$$

Figure 15:
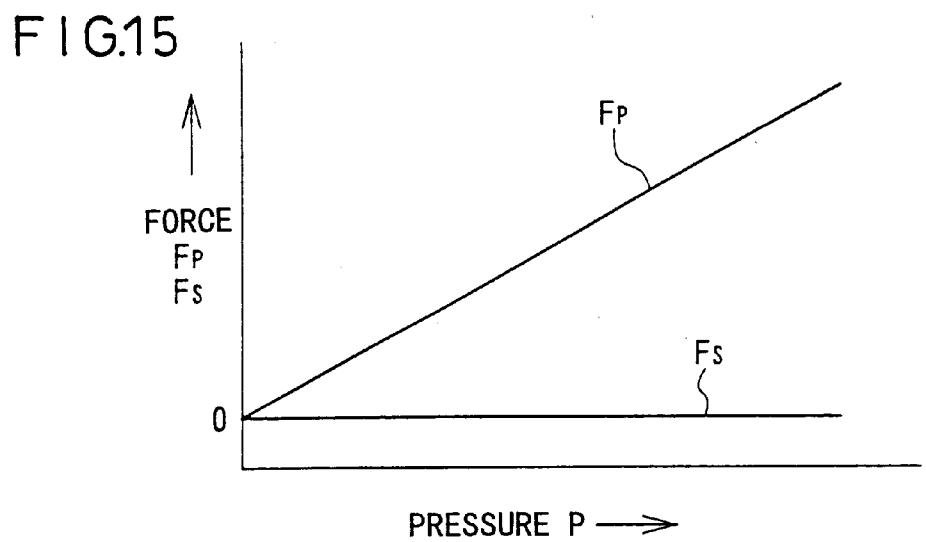
FIG. 15 shows a diagram illustrating the relation between the force applied to the diaphragm under the pressure of the pressurized fluid and the recovering force of the diaphragm in the piezoelectric valve according to the first or third embodiment.

FIG. 15 shows the change in the force Fp and the recovering force Fs when the pressure P of the compressed air is changed. Thus, if the pressure P of the compressed air is varied, the magnitude of the force Fp is always larger than the recovering force Fs, therefore the state wherein the diaphragm 38 is in contact with the valve seat 52 can be maintained, so long as the pressure in the diaphragm chamber 24a, 24b is the same as or higher than that in the passage 54. With the valve seat 52, the portion which contacts with the diaphragm 38 is formed flat and smoothly, and the surface of the diaphragm 38 is also formed flat and smoothly as a flat smooth surface 43, thus, the valve seat 52 is brought into a tight contact with the diaphragm 38 with no clearance, and the compressed air is not allowed to leak from the diaphragm chamber 24a, 24b into the passage 54.

On the other hand, when a drive signal is applied to the piezoelectric element 42 from the controlling device (not shown) through the connector 50, the piezoelectric element 42 is bent, resulting in a force displacing the diaphragm 38 in the direction of the arrow B being generated. When this force is larger than the difference between the force Fp applied to the diaphragm 38 by the compressed air and the force applied to the diaphragm 38 by the pressure in the passage 54, the diaphragm 38 is separated from the valve seat 52, resulting in the diaphragm chamber 24a being connected to the passage 54. Therefore, the compressed air is allowed to flow from the passage 54 to the output port 74 through the output port 16.

If a drive signal is further applied to the piezoelectric element 42, resulting in the piezoelectric element 42 being excessively bent, there is a possibility that the piezoelectric element 42 itself is contacted with a shock, and, in some cases, is broken. However, with the present embodiment, the piezoelectric element 42 is contacted with the cushioning member 56, which buffers the shock, and prevents the piezoelectric element 42 from being excessively bent, thus the possibility of the piezoelectric element 42 being broken as stated above is eliminated.

When the piezoelectric element 42 is contacted with the cushioning member 56 in this way, there is a possibility that the piezoelectric element 42 adheres to the cushioning member 56, which prevents the piezoelectric element 42 from recovering in the direction of the arrow A, however, because the compressed air is introduced from the groove portions 58 defined on the cushioning member 56 to a gap between the piezoelectric element 42 and the cushioning member 56, adherence of the piezoelectric element 42 to the cushioning member 56 is prevented, thus the piezoelectric element 42 can be returned to its original position with no hindrance.

With the piezoelectric valve 10 according to the first embodiment of the present invention, if the pressure of the compressed air introduced into the diaphragm chamber 24a, 24b is varied in the state wherein no drive signal is applied to the piezoelectric element 42, the diaphragm 38 is always in contact with the valve seat 52, thus a possibility that the compressed air is allowed to flow from the diaphragm chambers 24a and 24b to the passage 54, resulting from the variation in pressure is eliminated.

When a drive signal is applied to the piezoelectric element 42 to bend it, the piezoelectric element 42 is contacted with the cushioning member 56, resulting in it being prevented from being excessively deformed, thus there is no possibility of the piezoelectric element 42 being damaged.

Further, because the clearance 45 is formed between the wall portion constituting the diaphragm chamber 24a and the edge portion of the diaphragm 38, the diaphragm chamber 24a and 24b being connected to each other, the compressed air can freely flow between one side and the other side of the diaphragm 38, i.e., the diaphragm chambers 24a and 24b. Therefore, it is not necessary to provide a separate passage to introduce the compressed air between the one side and the other side, which allows the construction of the piezoelectric valve 10 of this type to be simplified.

Still further, with the valve seat 52, the portion which contacts with the diaphragm 38 is formed flat and smoothly, while the surface of the diaphragm 38 which is contacted with the valve seat 52 is formed as a flat smooth surface 43, therefore when the diaphragm 38 is contacted with the valve seat 52, the diaphragm 38 is brought into a tight contact with the valve seat 52 with no clearance, thus leakage of the fluid from the diaphragm chamber 24a to the passage 54 is prevented.

Next, a piezoelectric valve 100 according to the second embodiment of the present invention will be described with reference to FIG. 6. The same component as that of the first embodiment will be provided with the same reference numeral to omit the detailed description.

Figure 7:
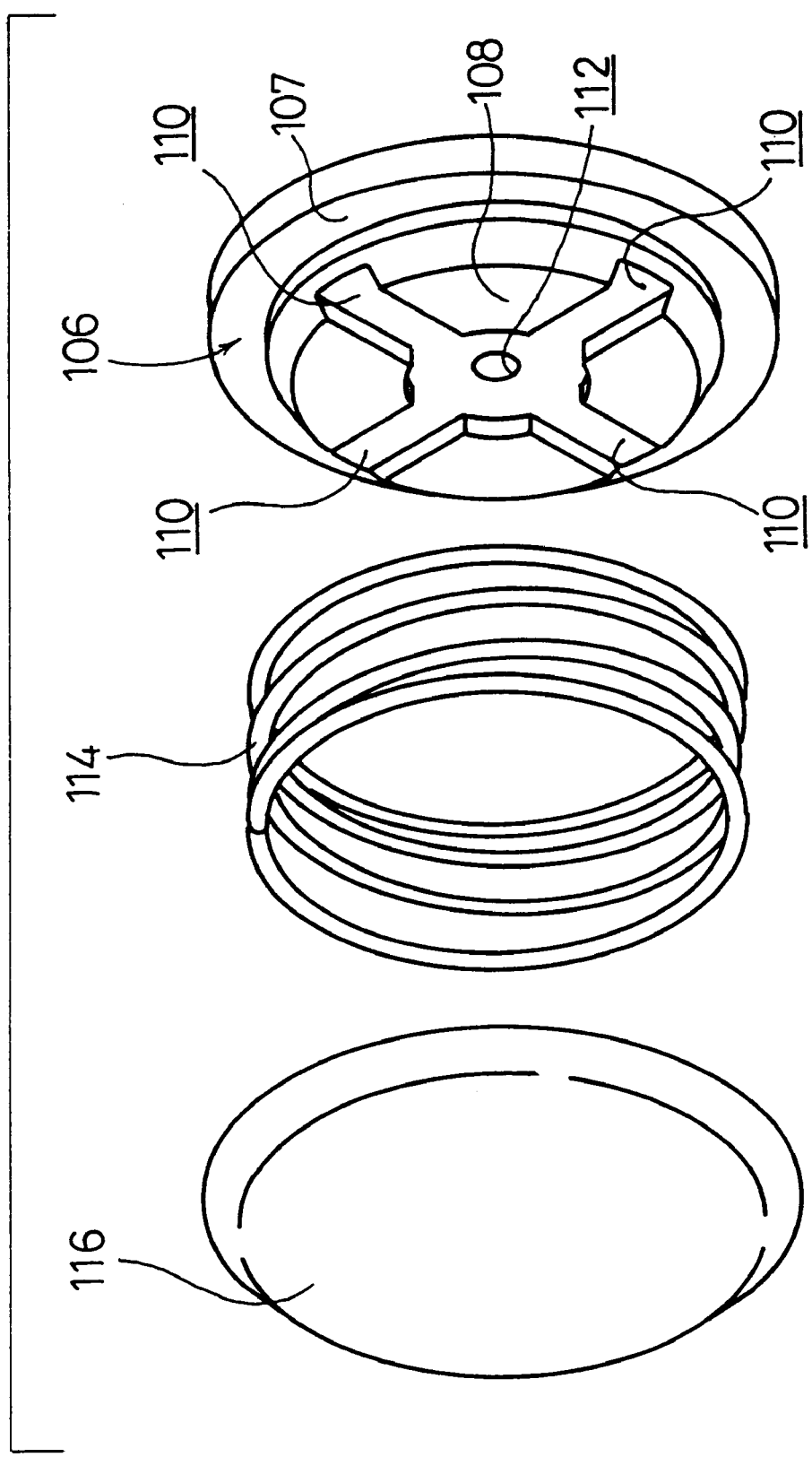
FIG. 7 shows a fragmentary exploded perspective view of a cushioning member, coil spring, and seating member of the piezoelectric valve in FIG. 6.

In the inside wall of a cover member 102 provided for the piezoelectric valve 100, a recess 104 is formed, and into the recess 104, a cushioning member 106 formed in a nearly disk-like shape with a material having an elasticity such as resin and rubber is fitted. On one surface of the cushioning member 106, as shown in FIG. 7, a convex portion 108 is formed, and in the convex portion 108, a plurality of groove portions 110 are radially defined. In the central portion of the cushioning member 106, a hole portion 112 is defined.

Figure 6:
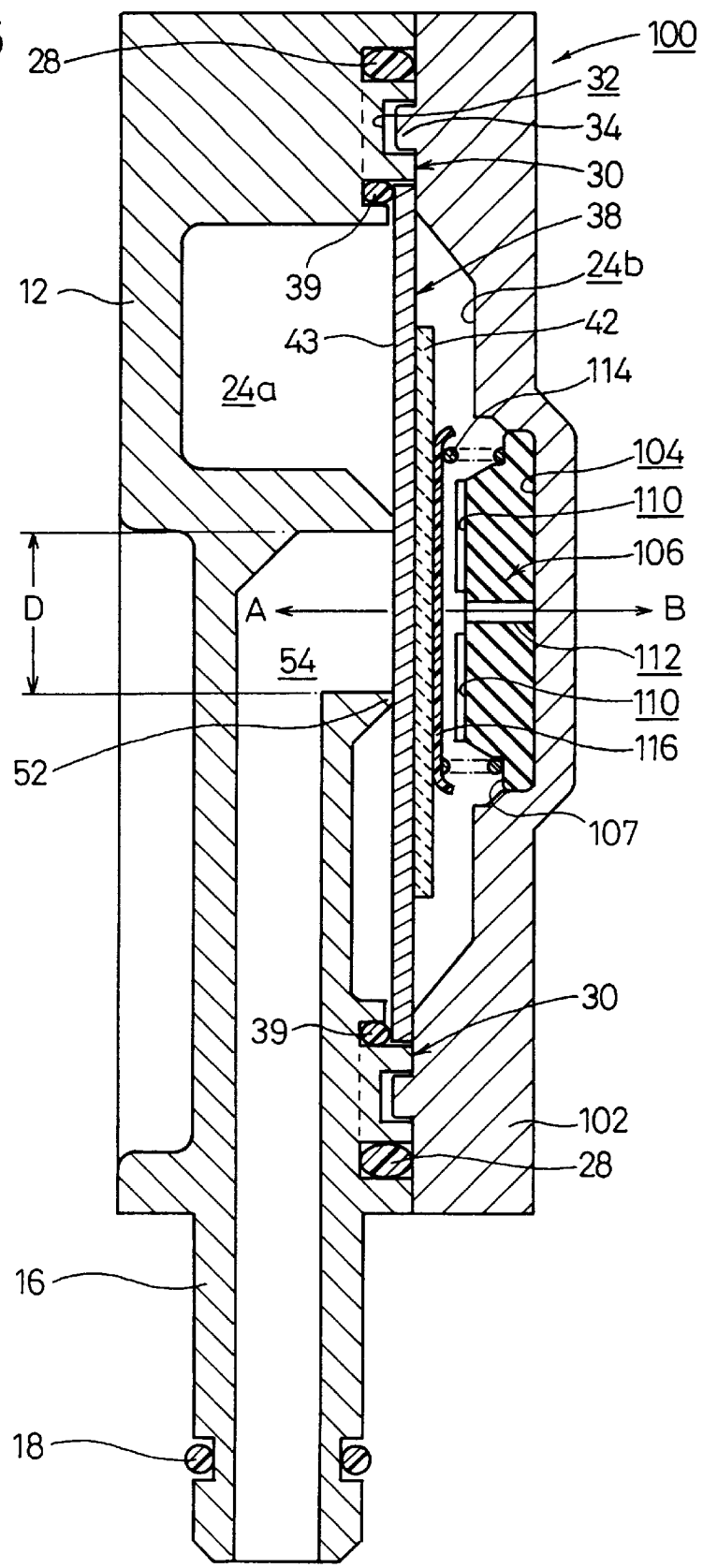
FIG. 6 shows a longitudinal sectional view of a piezoelectric valve according to the second embodiment of the present invention.

In the vicinity of the edge portion of the cushioning member 106, as shown in FIG. 6 and FIG. 7, a step portion 107 is formed, and on this step portion, one end of a coil spring (elastic member) 114 Is seated, while the other end of the coil spring 114 is seated on a seating member 116 fixed to the piezoelectric element 42. The seating member 116 is formed in a nearly disk-like shape with a material having an elasticity such as resin and rubber, and the edge portion is curved toward the cushioning member 106. Being configured as this, the piezoelectric element 42 is always energized by the coil spring 114 in the direction of the arrow A, while the possibility of the piezoelectric element 42 being damaged by the coil spring 114 is eliminated.

The piezoelectric valve 100 according to the second embodiment of the present invention is basically configured as above, and the function will be described hereinafter.

When no drive signal is applied to the piezoelectric element 42 from the controlling device (not shown), the piezoelectric element 42 is not deformed, and as long as the pressure in the diaphragm chamber 24a, 24b is the same as or higher than that in the passage 54, elastic energy will not be built up in the diaphragm 38, and the diaphragm 38 will be held in the flat state. In this case, the diaphragm 38 is contacted with the valve seat 52 to close up the passage 54. The diaphragm 38 is positively contacted with the valve seat 52 by the elastic force of the coil spring 114, which prevents the air, etc. from leaking from the diaphragm chamber 24a to the passage 54.

When compressed air is supplied from the input port 14a, 14b (see FIG. 2), the compressed air is introduced into the diaphragm chamber 24a, 24b, and the pressure of the compressed air is applied to the diaphragm 38 in the direction of the arrow A.

The magnitude of the force F which is applied to the diaphragm 38 in the direction of the arrow A is the sum of the force Fp by the pressure P of the compressed air and the elastic force f of the coil spring 114, thus if the spring constant of the coil spring 114 is $k_2$, and the length whereby the coil spring 114 is contracted when the coil spring 114 is installed between the cushioning member 106 and the seating member 116 is $x_2$, F is expressed by:

$$F=Fp+f=\pi/4\times D^2\times P+k_2\times x_2$$

where $Fp=\pi/4\times D^2\times P$, and $f=k_2\times x_2$

On the other hand, the diaphragm 38 has an elasticity, however, it is held in the flat state, being supported by the valve seat 52 with no elastic energy being built up therein, thus the recovering force Fs applied to the diaphragm 38 in the direction of the arrow B is expressed:

$$Fs=0$$

Figure 16:
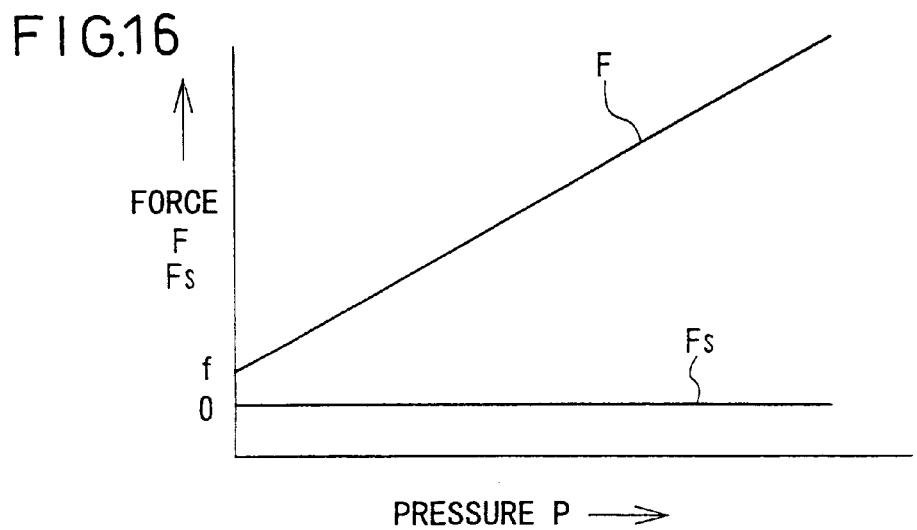
FIG. 16 shows a diagram illustrating the relation between the force applied to the diaphragm under the pressure of the pressurized fluid and the recovering force of the diaphragm in the piezoelectric valve according to the second embodiment.

FIG. 16 shows the change in the force F and the recovering force Fs when the pressure P of the compressed air is changed. Thus, even if the pressure P of the compressed air is varied, the force F is always larger than the recovering force Fs, therefore the state wherein the diaphragm 38 is in contact with the valve seat 52 can be maintained. Even if the pressure P in the diaphragm chamber 24a, 24b is as low as the pressure in the passage 54, the diaphragm 38 is pressed in the direction of the arrow A by the elastic force f of the coil spring 114. Therefore, even if the pressure in the diaphragm chamber 24a, 24b or the passage 54 is varied, the diaphragm 38 can positively close up the passage 54.

When a drive signal is applied to the piezoelectric element 42 from the controlling device (not shown), the piezoelectric element 42 is bent, resulting in a force displacing the diaphragm 38 in the direction of the arrow B being generated. If this force is larger than the difference between the sum of the force Fp applied to the diaphragm 38 by the compressed air and the elastic force f of the coil spring 114, and the force applied to the diaphragm 38 by the pressure in the passage 54, the diaphragm 38 is separated from the valve seat 52, resulting in the diaphragm chamber 24a being connected to the passage 54. Therefore, the compressed air is allowed to flow from the passage 54 to the output port 16.

If a drive signal is further applied to the piezoelectric element 42, resulting in the piezoelectric element 42 being excessively bent, there is a possibility that the piezoelectric element 42 itself is contacted with a shock, and is broken. However, the piezoelectric element 42 is contacted with the cushioning member 106 through the seating member 116, which buffers the shock, and prevents the piezoelectric element 42 from being excessively bent, thus the possibility of the piezoelectric element 42 being broken as stated above is eliminated.

When the seating member 116 is contacted with the cushioning member 106, there is a possibility that the seating member 116 adheres to the cushioning member 106, which prevents the piezoelectric element 42 from recovering in the direction of the arrow A. However, because the piezoelectric element 42 is energized in the direction of the arrow A by the coil spring 114, and the compressed air is introduced from the groove portions 110 formed in the cushioning member 106 to between the seating member 116 and the cushioning member 56, adherence of the seating member 116 to the cushioning member 106 is prevented.

With the piezoelectric valve 100 according to the second embodiment of the present invention, by energizing the piezoelectric element 42 toward the valve seat 52 by the coil spring 114, the diaphragm 38 can be positively contacted with the valve seat 52 to close up the passage 54 when the piezoelectric element 42 is not driven.

Figure 8:
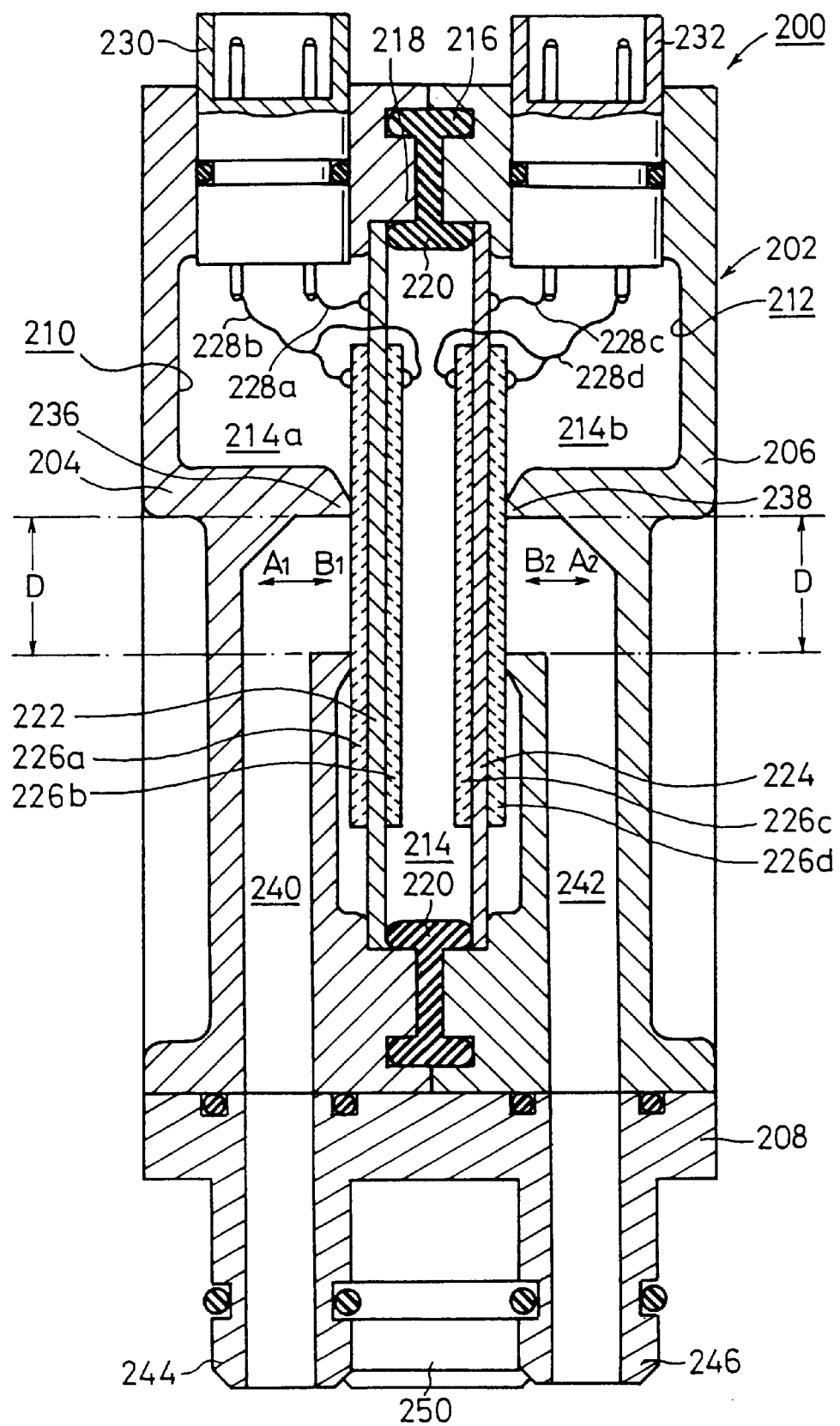
FIG. 8 shows a longitudinal sectional view of a piezoelectric valve according to the third embodiment of the present invention.
Figure 9:
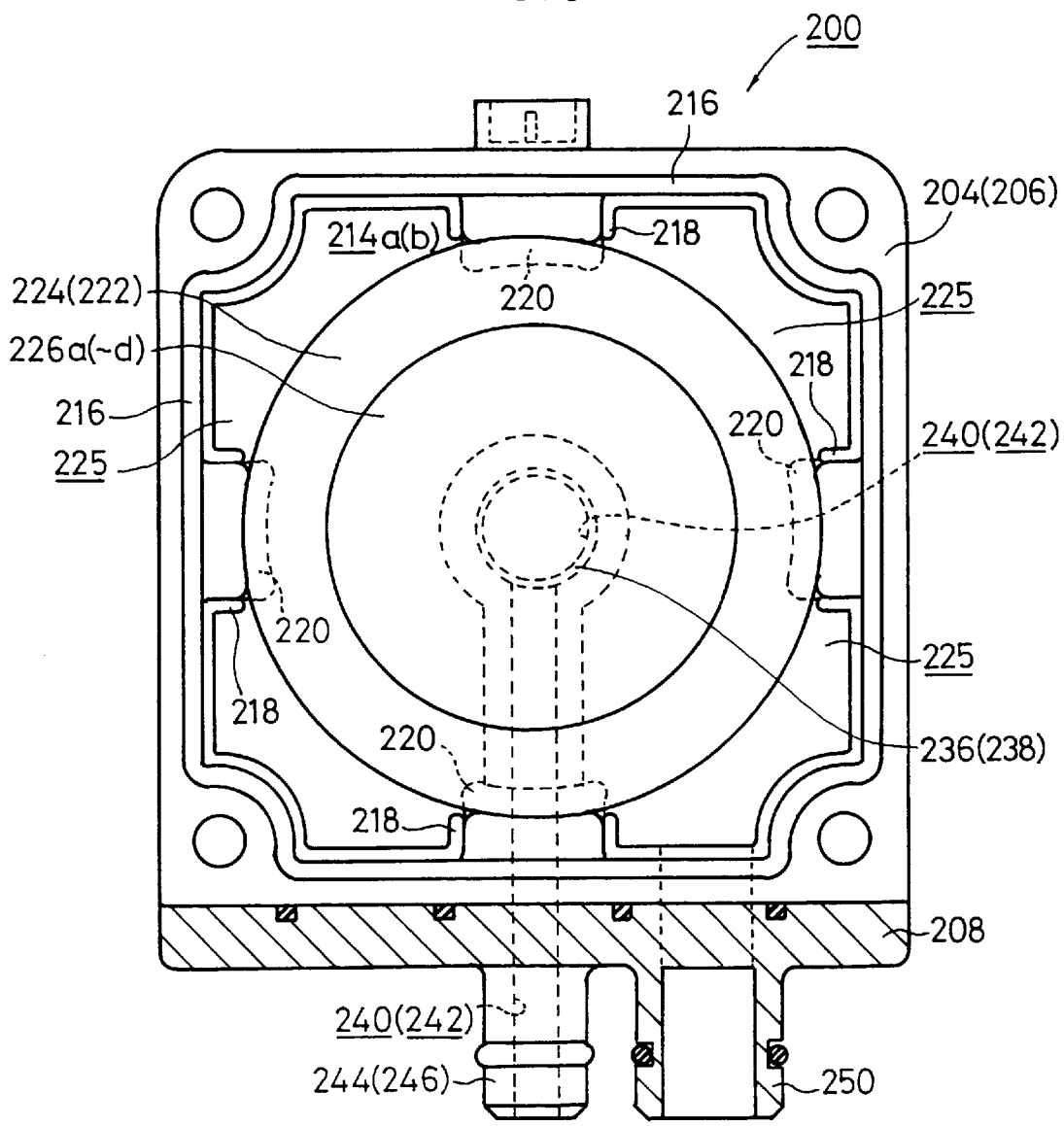
FIG. 9 shows a front view of the piezoelectric valve in FIG. 8 illustrating the state wherein one of the valve bodies is removed.

Next, a piezoelectric valve 200 according to the third embodiment of the present invention will be described with reference to FIG. 8 and FIG. 9.

A housing 202 constituting this piezoelectric valve 200 comprises a first valve body 204, a second valve body 206 which are fixed, being opposed to each other, and a port block 208 which is fixed to the bottom of the first valve body 204, the second valve body 206.

In the first valve body 204, the second valve body 206, a recess 210, 212 is formed, respectively, and by the recesses 210 and 212, diaphragm chambers 214a, 214b connecting to each other are formed. Between the first valve body 204 and the second valve body 206, as shown in FIG. 9, a gasket 216 is provided, surrounding the diaphragm chambers 214a, 214b, and the gasket 216 prevents the pressurized fluid from leaking from between the first valve body 204 and the second valve body 206. On the wall portions constituting the diaphragm chambers 214a, 214b, a plurality of support portions 218 are formed, each being spaced 90° apart from adjacent ones, and protruded toward the center of the diaphragm chambers 214a, 214b, and on the gasket 216, sandwiching portions 220 are formed so that they face the diaphragm chambers 214a, 214b (see FIG. 8).

Figure 10:
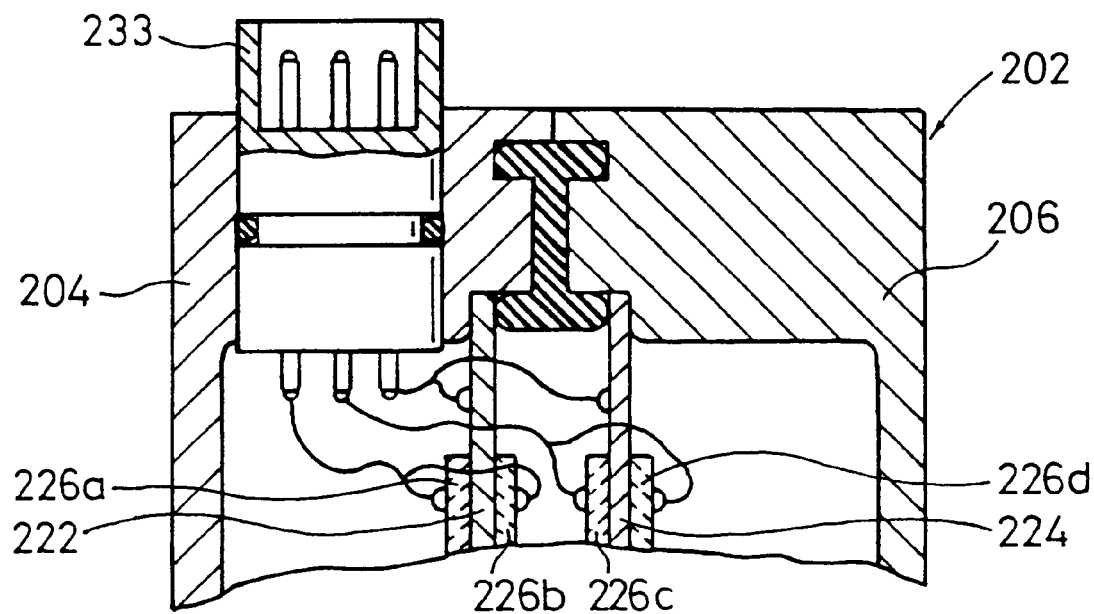
FIG. 10 shows a fragmentary enlarged longitudinal sectional view of the piezoelectric valve in FIG. 8 when one connector is provided.

In the support portions 218, a first diaphragm 222 is provided on the first valve body 204 side, while a second diaphragm 224 is provided on the second valve body 206 side, and the first diaphragm 222 and the second diaphragm 224 are supported by the sandwiching portions 218 with a set spacing being given therebetween. The first, second diaphragm 222, 224 is formed with a metal having an elasticity such as stainless steel, and between the edge thereof and the wall portion constituting the diaphragm chambers 214a, 214b, a clearance 225 is formed. On both surfaces of the first diaphragm 222 and the second diaphragm 224, flat and nearly circular piezoelectric elements 226a to 226d are fixed. To the first diaphragm 222 whereto one surface of the piezoelectric elements 226a, 226b are fixed, an electric wire 228a is connected, while, to the other surfaces of the piezoelectric elements 226a, 226b, an electric wire 228b is connected, and each electric wire 228a, 228b is connected to a controlling device (not shown) through a connector 230. To the second diaphragm 224 whereto one surface of the piezoelectric elements 226c, 226d are fixed, an electric wire 228c is connected, while, to the other surfaces of the piezoelectric elements 226c, 226d, an electric wire 228d is connected, and each electric wire 228c, 228d is connected to a controlling device (not shown) through a connector 232. Therefore, a drive signal inputted from the controlling device is applied to the one surface and the other surface of the piezoelectric elements 226a to 226d. In this case, the first and second diaphragms 222, 224, and the piezoelectric elements 226a to 226d may be connected to a single connector 233, as shown in FIG. 10.

On the bottom constituting the recess 210, 212, a first valve seat 236, a second valve seat 238 both in a circular shape whereto the piezoelectric elements 226a, 226d of the first diaphragm 222, the second diaphragm 224 can be contacted are formed, and in the central portion of the first valve seat 236, the second valve seat 238, passages 240, 242 are formed. The passages 240, 242 are connected to a first output port 244, a second output port 246, respectively, formed in the port block 208.

Figure 11:
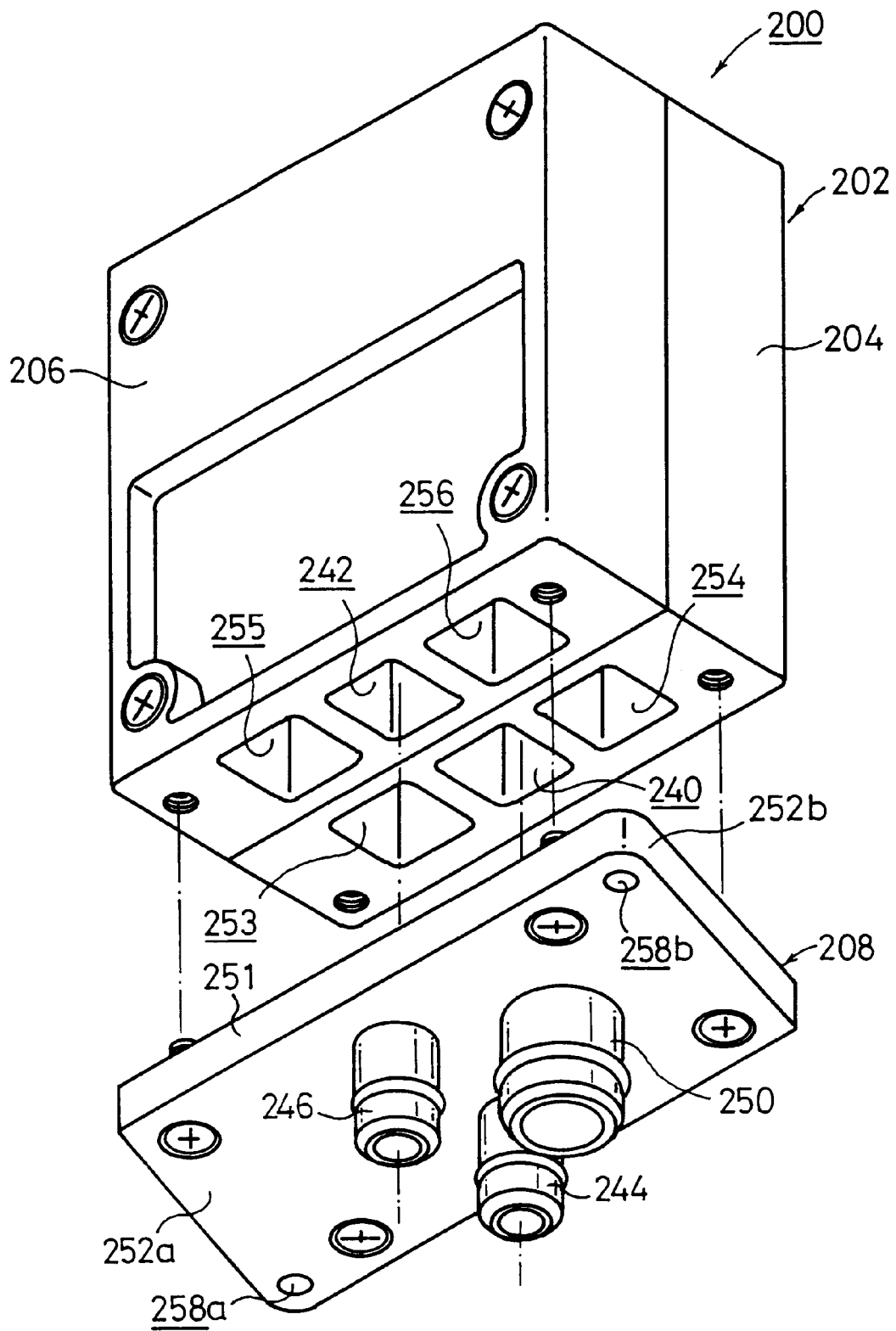
FIG. 11 shows a fragmentary exploded perspective view illustrating the piezoelectric valve in FIG. 8.
Figure 12:
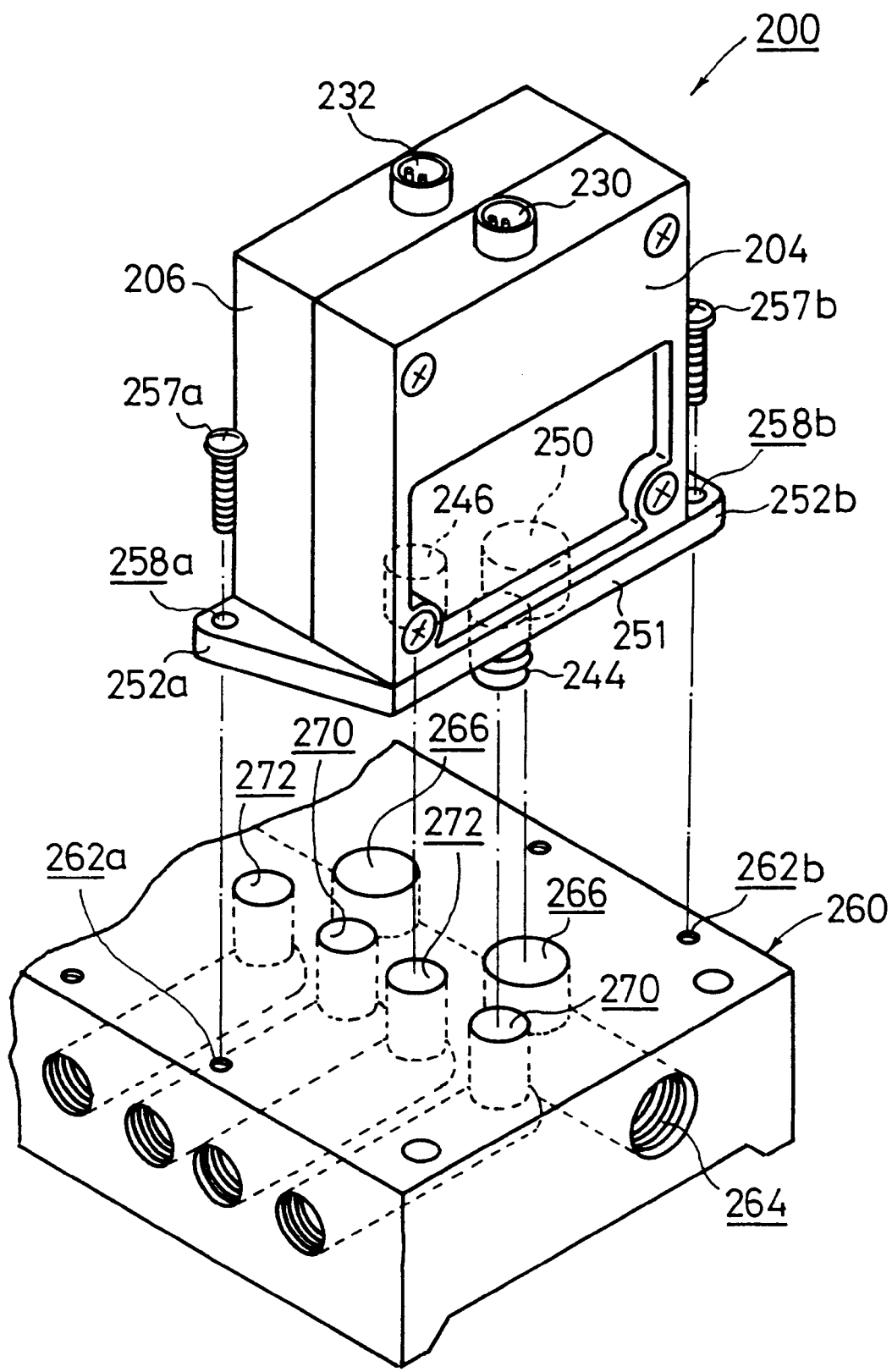
FIG. 12 shows a perspective view of the piezoelectric valve in FIG. 8, and a base plate whereon this piezoelectric valve is mounted.
Figure 13:
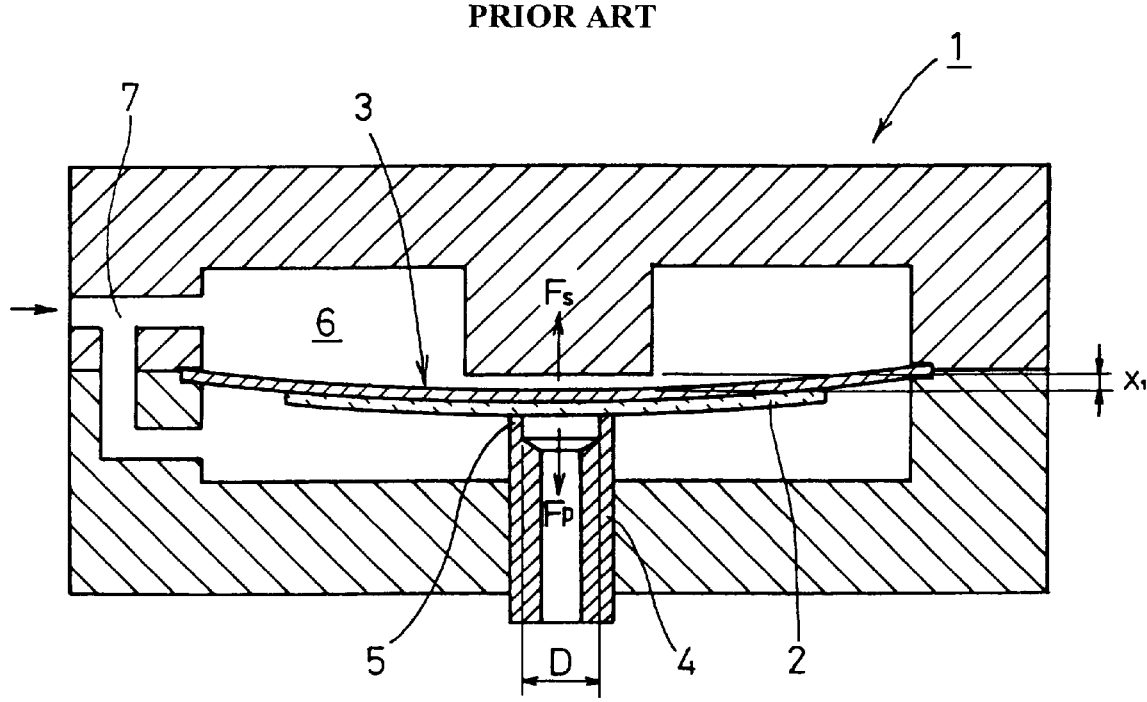
FIG. 13 shows a schematic longitudinal sectional view of a piezoelectric valve according to the prior art.
Figure 14:
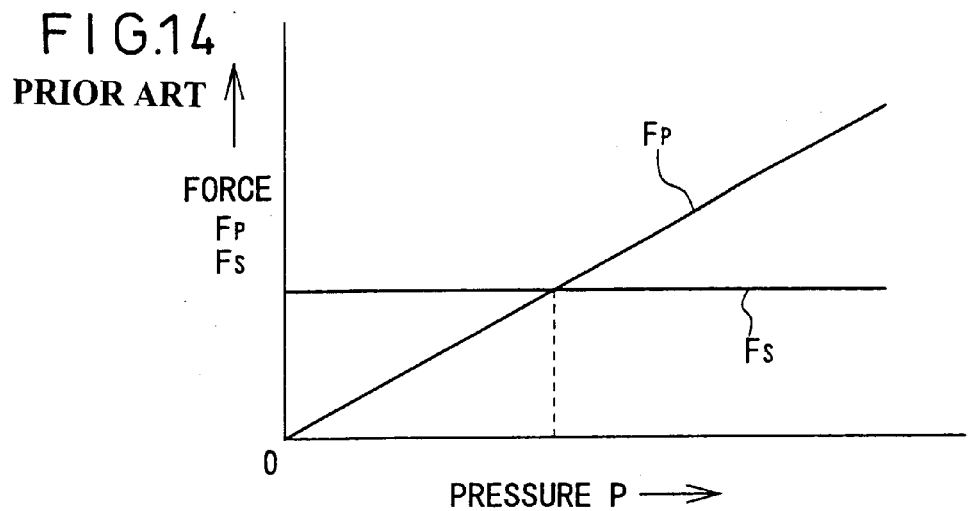
FIG. 14 shows a diagram illustrating the relation between a force applied to the diaphragm under the pressure of the pressurized fluid and a recovering force of the diaphragm in the piezoelectric valve according to the prior art.

In the port block 208, an input port 250 is formed, and the passage in the input port 250 is branched (not shown) in the port block 208, connecting to passages 254, 256 formed in the first valve body 204, the second valve body 206 connecting to the diaphragm chambers 214a, 214b (see FIG. 11). In the first valve body 204, the second valve body 206, passages 253, 255 connecting to the diaphragm chambers 214a, 214b are formed, and when the port block 208 is mounted to the first valve body 204, the second valve body 206, being turned through 180°, the passages 253, 255 are connected to the input port 250. In the port block 208, a plate-like portion 251 which is mounted to the first valve body 204, the second valve body 206 is formed. In the shorter edge portions of short length of the plate-like portion 251, as shown in FIG. 12, mounting portions 252a, 252b are formed so that they are protruded from the first valve body 204, the second valve body 206 at an angle, and in the mounting portions 252a, 252b, hole portions 258a, 258b whereinto screws 257a, 257b are inserted are formed.

This piezoelectric valve 200 is mounted on an elongate base plate 260, and by tightening the screws 257a, 257b to threaded holes 262a, 262b, the piezoelectric valve 200 is fixed to the base plate 260. In the base plate 260, along the longitudinal direction thereof, a supply passage 264 for pressurized fluid, preferably, compressed air is formed, and the supply passage 264 is connected to a compressed air supply (not shown). To the supply passage 264, a supply hole 266 which is opened at the top of the base plate 260 is connected and to the supply hole 266, the input port 250 for the piezoelectric valve 200 is mounted. In addition, in the top surface of the base plate 260, a first output hole 270 whereto a first output port 244 is mounted, and a second output hole 272 whereto a second output port 246 is mounted are formed, and the first output hole 270, the second output hole 272 are opened at the side of the base plate 260, being formed bent.

In the base plate 260, a plurality of supply holes 266, and first, second output holes 270, 272 are formed so that a plurality of piezoelectric valves 200 can be mounted.

The piezoelectric valve 200 according to the third embodiment of the present invention is basically configured as above, and the function will be described hereinafter.

When no drive signal is applied to the piezoelectric elements 226a to 226d from the controlling device (not shown) through the connectors 230, 232, the piezoelectric elements 226a to 226d are not deformed. As long as the pressure in the diaphragm chambers 214a, 214b is the same as or higher than that in the passages 240, 242, elastic energy will not be built up in the first, second diaphragms 222, 224, and the first, second diaphragms 222, 224 will be held in the flat state. In this case, the piezoelectric elements 226a, 226d fixed to the first, second diaphragms 222, 224 are contacted with the first, second valve seats 236, 238, respectively, to close up the passages 240, 242.

When the compressed air supply (not shown) is energized, and compressed air is supplied to the supply passage 264 in the base plate 260, the compressed air is introduced into the diaphragm chambers 214a, 214b through the input port 250. In this case, the pressure in the diaphragm chambers 214a, 214b is increased to above that in the passage 240, 242 by the compressed air, thus the pressure of the compressed air is applied to the first, second diaphragms 222, 224 in the direction toward the first, second valve seats 236, 238, i.e., to the first diaphragm 222 in the direction of the arrow $A_1$, and to the second diaphragm 224 in the direction of the arrow $A_2$.

On the other hand, the first, second diaphragms 222, 224 have elasticity, however, the first, second diaphragms 222, 224 are supported by the first, second valve seats 236, 238, respectively, and thus are not deformed by the pressure of the compressed air, being held in the flat state with no elastic energy being built up therein.

Therefore, the magnitude of the force Fp which is applied to the first, second diaphragms 222, 224 in the directions of the arrows $A_1$, $A_2$, and that of the recovering force Fs which is applied in the directions of the arrows $B_1$, $B_2$ which are the opposite directions of those of the arrows $A_1$, $A_2$ are expressed by the following equation, for the first, second diaphragms 222, 224, respectively, as is the case with the first embodiment, $$Fp = \pi/4 \times D^2 \times P$$

$$Fs = 0$$

and as shown in FIG. 15, if the pressure P of the compressed air is varied, the magnitude of the force Fp is always larger than the recovering force Fs, therefore the state wherein the first, second diaphragms 222, 224 are in contact with the valve seats 236, 238 can be maintained, the passages 240, 242 being closed up, so long as the pressure in the diaphragm chambers 214a, 214b are the same as or higher than the pressure in the passages 240, 242.

When a drive signal is applied to the piezoelectric elements 226a, 226b for the first diaphragm 222 from the controlling device (not shown), the piezoelectric elements 226a, 226b are bent, resulting in a force displacing the first diaphragm 222 in the direction of the arrow $B_1$ being generated. When this force is larger than the difference between the force Fp applied to the first diaphragm 222 by the compressed air and the force applied to the first diaphragm 222 by the pressure in the passage 240, the first diaphragm 222 is separated from the first valve seat 236, resulting in the diaphragm chamber 214a being connected to the passage 240. Therefore, the compressed air is allowed to flow from the passage 240 to the first output port 270 through the first output port 244.

When a drive signal is applied to the piezoelectric elements 226c, 226d for the second diaphragm 224, a force displacing the second diaphragm 224 in the direction of the arrow $B_2$ is generated in the same way as stated above, and the compressed air is allowed to flow from the passage 242 the second output port 272.

Further, by applying a drive signal to both of the piezoelectric elements 226a, 226b for the first diaphragm 222 and the piezoelectric elements 226c, 226d for the second diaphragm 224 to displace the first, second diaphragms 222, 224 in the direction of the arrows $B_1$, $B_2$, the compressed air can be simultaneously introduced to both of the first, second output holes 270, 272.

As stated above, with the piezoelectric valve 200 according to the third embodiment, the compressed air can be introduced to both or either of the first output port 244 and the second output port 246 by means of a single piezoelectric valve 200.

INDUSTRIAL APPLICABILITY

With the piezoelectric valve according to the present invention, the following effects and advantages can be obtained.

Even if the pressure of the fluid introduced into the diaphragm chamber is varied in the state wherein no drive power is applied to the piezoelectric element, there is no possibility of the fluid leaking, because the diaphragm is always in contact with the valve seat. In addition, even if the piezoelectric element is excessively deformed, it is contacted with the cushioning member, thus there is no possibility of the piezoelectric element being damaged. Therefore, the reliability of this piezoelectric valve is improved.

Further, by allowing the fluid to flow through the clearance between the edge portion of the diaphragm and the wall portion of the diaphragm chamber, the need for providing a passage to introduce the fluid between one side and the other side of the diaphragm is eliminated, which simplifies the construction of this piezoelectric valve, and thus allows the manufacturing cost of the piezoelectric valve to be reduced.

Still further, by energizing the piezoelectric element toward the valve seat by the elastic member, the diaphragm can be positively contacted when the piezoelectric element is not driven, which allows the pressurized fluid to be prevented from leaking, resulting in the reliability of the piezoelectric valve being further improved.

In addition, by providing a plurality of diaphragms, and selectively displacing the respective diaphragms, the flow rates of the compressed air introduced to a plurality of output ports can be controlled by means of a single piezoelectric valve, which eliminates the need for providing a plurality of piezoelectric valves, and thus allows simplifying the construction of a device using this piezoelectric valve.

What is claimed is:

1. A piezoelectric valve comprising:
   diaphragm chambers;
   a diaphragm disposed in the diaphragm chambers and constituting a valve body;
   an input port configured to supply fluid to the diaphragm;
   a piezoelectric element provided on one surface of said diaphragm, and configured to displace said diaphragm;
   a cushioning member opposed to said piezoelectric element, configured to contact the piezoelectric element only when the diaphragm is in a flexed state, and provided on a housing forming said diaphragm chambers; and
   a valve seat provided as an output port opening in said housing, wherewith a second surface of said diaphragm can be contacted;
   wherein said diaphragm contacts said valve seat without elastic energy being built up therein for closing up said output port when no drive power is applied to the piezoelectric element, and fluid pressure biases said diaphragm into contact with said valve seat so that a variation in the pressure of the fluid will not cause the diaphragm to become separated from the valve seat when a positive fluid pressure is applied to the diaphragm chambers while no drive power is applied to the piezoelectric element.

2. A piezoelectric valve according to claim 1, wherein a clearance connecting said diaphragm chambers to each other and which is partitioned by said diaphragm is formed between the diaphragm and the housing, and a fluid introduced into said diaphragm chambers can freely flow through said clearance.

3. A piezoelectric valve according to claim 1, wherein the portion of said valve seat which is contacted with said diaphragm is formed flat and smoothly, said diaphragm is formed with a metallic sheet having an elasticity, and the portion of said diaphragm which is contacted with said valve seat is formed flat and smoothly.

4. A piezoelectric valve according to claim 3, wherein a drive signal is applied through said diaphragm to the surface of the piezoelectric element which is fixed to the diaphragm formed with the metallic sheet.

5. A piezoelectric valve according to claim 1, wherein said diaphragm is formed with a metallic sheet.

6. A piezoelectric valve according to claim 1, wherein grooves to prevent adherence of said cushioning member to said piezoelectric element are defined in the surface of the cushioning member opposed to said piezoelectric element.

7. A piezoelectric valve according to claim 1, wherein said cushioning member is fitted into a recess which is formed in said housing.

8. A piezoelectric valve according to claim 1, wherein said cushioning member is formed with resin or rubber which has an elasticity.

9. A piezoelectric valve according to claim 1, wherein an elastic member which energizes said diaphragm toward said valve seat is provided between the piezoelectric element and the housing, and a seating member on which said elastic member is seated is provided on said piezoelectric element.

10. A piezoelectric valve according to claim 9, wherein said elastic member is a coil spring.

11. A piezoelectric valve according to claim 9, wherein said seating member is formed with a material having an elasticity such as resin or rubber.

12. A piezoelectric valve according to claim 1, further comprising:
   a support portion provided on said housing and protruded toward said diaphragm chambers, wherein said diaphragm is held by said support portion.

13. A piezoelectric valve according to claim 1, further comprising:
   a lever portion formed on said housing in order to mount said piezoelectric valve such that said lever portion can be elastically and freely bent; and;
   an engaging pawl formed on said lever portion, and configured to engage with a device to which said piezoelectric valve is mounted.

14. A piezoelectric valve according to claim 1, wherein said diaphragm is supported by a sealing member loaded in a recess in said housing.

15. A piezoelectric valve according to claim 1, wherein a cover member is connected to the housing, and said diaphragm chambers are maintained airtight by a sealing member loaded between said housing and said cover member.

* * * * *